(12) United States Patent
Gartner et al.

(10) Patent No.: US 6,497,424 B2
(45) Date of Patent: *Dec. 24, 2002

(54) COMBINATION ICE-CHEST STROLLER

(76) Inventors: Tarron L. Gartner, 11010 Lawn Haven, Dallas, TX (US) 75230; Robin L. Donsky, 6130 Prestoncrest La., Dallas, TX (US) 75230

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,268

(22) Filed: Jul. 29, 1999

(65) Prior Publication Data

US 2002/0060438 A1 May 23, 2002

(51) Int. Cl.7 .............................. B62B 7/12; B65D 81/38
(52) U.S. Cl. .................. 280/47.4; 280/47.38; 280/647; 220/592.2
(58) Field of Search .............................. 62/457.1, 457.7; 297/188.08, 188.09, 188.11, 217.1; 280/647, 87.01, 87.021, 47.34, 47.35, 47.38, 47.4, 79.2; 296/22; 206/545; 220/592.2

(56) References Cited

U.S. PATENT DOCUMENTS

| | | | |
|---|---|---|---|
| 3,230,006 A | | 1/1966 | Sokolis |
| 3,930,662 A | | 1/1976 | Manner |
| 4,460,188 A | | 7/1984 | Maloof |
| 4,724,681 A | | 2/1988 | Bartholomew et al. |
| 4,735,426 A | * | 4/1988 | McConnell .............. 280/87.01 |
| 4,846,493 A | | 7/1989 | Mason |
| 5,100,198 A | | 3/1992 | Baltzell |
| 5,135,243 A | * | 8/1992 | Carpenter ................ 280/87.01 |
| 5,249,438 A | | 10/1993 | Rhaney et al. |
| 5,269,157 A | | 12/1993 | Ciminelli et al. |
| 5,275,018 A | | 1/1994 | Lin et al. |
| 5,305,544 A | * | 4/1994 | Testa, Jr. ................ 206/315.11 |
| 5,310,199 A | * | 5/1994 | Korkin .................... 280/87.01 |
| 5,395,157 A | * | 3/1995 | Rollo et al. ............. 297/344.26 |
| 5,465,985 A | * | 11/1995 | Devan et al. .................. 280/30 |
| 5,480,170 A | * | 1/1996 | Kaiser, II .................... 280/30 |
| 5,538,267 A | * | 7/1996 | Pasin et al. .............. 280/87.01 |
| 5,628,544 A | * | 5/1997 | Goodman et al. ...... 297/188.14 |
| 5,636,852 A | * | 6/1997 | Sistrunk et al. ................ 280/30 |
| 5,641,197 A | * | 6/1997 | Springmann ........... 297/188.11 |
| 5,653,458 A | * | 8/1997 | Chaparian .................... 280/30 |
| 5,660,296 A | | 8/1997 | Greenwich |
| 5,727,844 A | * | 3/1998 | O'Quinn et al. .......... 297/217.1 |
| 5,803,472 A | | 9/1998 | Lien |
| 5,876,047 A | * | 3/1999 | Dennis .................... 280/47.35 |
| 5,884,795 A | * | 3/1999 | Godbersen et al. ...... 220/23.86 |
| 5,899,467 A | | 5/1999 | Henkel |
| 6,076,298 A | * | 6/2000 | Teel ............................ 43/54.1 |
| 6,193,247 B1 | * | 2/2001 | Spear et al. ............. 280/47.35 |
| 6,216,488 B1 | * | 4/2001 | Rucker ....................... 62/457.7 |
| 6,318,740 B1 | * | 11/2001 | Nappo ..................... 280/87.01 |

* cited by examiner

*Primary Examiner*—Brian L. Johnson
*Assistant Examiner*—Jeffrey J. Restifo
(74) *Attorney, Agent, or Firm*—Jackson Walker LLP

(57) ABSTRACT

An ice chest or portable cooler is combined with a child stroller to transport small children in seat assemblies that are integral with the lid or cover of the cooler. The ice chest-stroller rolls along on a front and rear axle/wheel assembly and can be either pulled by means of a retractable tow bar or pushed by means of a fold-down push handle. Convenient drawer storage units are located under the front and rear child seats on top of the cooler body lid. To access food and beverages inside the cooler, the entire lid assembly with storage drawers and child seats is lifted up from the top on a hinge attached to the side of the lid assembly and cooler body.

12 Claims, 4 Drawing Sheets

COMBINATION ICE-CHEST STROLLER

FIELD OF THE INVENTION

The present invention relates generally to portable coolers and more specifically to a portable cooler which is used to transport small children and supplies as well.

BACKGROUND OF THE INVENTION

Portable coolers predominantly used for cool storage and transport of food and beverages are well known. There are a large variety of these types of products ranging widely in size, shape, materials, and colors/styles. Some are made with metal exteriors and plastic interiors or insulated liners. Others are constructed entirely from lightweight, molded plastic. Larger models have generally been designed with a set of small wheels and a tow handle to make them easier and more convenient for transportation to parks, sporting events, or other types of gatherings.

U.S. Pat. No. 4,724,681 to Bartholomew, et al., U.S. Pat. No. 4,846,493 to Mason, U.S. Pat. No. 5,249,438 to Rahaney et al., U.S. Pat. No. 3,230,0062 to Sokolis, U.S. Pat. No. 3,930,662 to Manner, U.S. Pat. No. 4,460,188 to Naloof, U.S. Pat. No. 5,100,198 to Baltzell, U.S. Pat. No. 5,269,157 to Ciminelli et al., U.S. Pat. No. 5,275,018 to Lin et al., U.S. Pat. No. 5, 660,296 to Greenwich, U.S. Pat. No. 5,803,472 to Lien, and U.S. Pat. No. 5,899,467 to Henkel, none of which were designed to transport children, disclose rolling coolers of various constructions having pull handles. Some of the known embodiments of the rolling coolers include table tops and chairs associated with the cooler. However, none of the prior art discloses or suggests the improved ice chest stroller as claimed herein.

SUMMARY OF THE INVENTION

The present invention provides an ice chest cooler that can be used to transport small children, food and beverages. The present invention also provides a compact and lightweight combined cooler-stroller that may be conveniently stored and transported in a vehicle. In some embodiments, the rolling cooler stroller can be pulled like a wagon or cart or pushed from behind like a stroller or carriage.

In preferred embodiments, the cooler is rectangular in shape, adequate in size and capacity to hold a fair portion of food, beverages, and cooling ice, molded and assembled from lightweight plastic materials and adequately insulated to maintain and keep its contents cool. The cooler and body is preferably supported by a system of axles and wheels near each end, a front end and rear end defined opposite short sides of its rectangular shape, each having an axle adjacent to said ends with a wheel-tire assembly attached to each end of both axles, four wheels in all. The front axle-wheel assembly preferably swivels to allow steering from the front end of the rectangular shaped cooler body. The front end of the cooler body is attached, at a point central to the end and on its lower extreme surface by means of a swivel pin mechanism, to a bar of sufficient length protruding in a forward direction and terminating in a handle. The forward protruding bar, or tow bar, provides a means by which the cooler body is easily towed by a person. The tow bar may also be molded from a lightweight plastic material and the handle grip at the terminating end opposite the cooler body is of such a shape and size that it allows a comfortable ergonomically designed grip for the person pulling the unit along. The length of the tow bar is preferably such that an adult ranging in stature will be able to comfortably tow the unit in a normal walking posture without suffering the difficulty of having to twist, stoop, or bend. In some embodiments, the length of the tow bar is adjustable. The opposite end of the tow bar attaches to the forward wheel-axle assembly terminating in a swivel mechanism that allows for a wide range of vertical and lateral movement, thereby providing a means of steering the unit. In a preferred embodiment, the tow bar is designed to retract completely underneath the cooler body so that the unit can be pushed from the rear by means of upwardly extending push handles. The rear push handles preferably extend slightly rearward and upward from the lower portion of the cooler body immediately behind the rear axle-wheel assembly. The rear push handles also generally extend upwards to a height that is comfortable for a user to grasp when pushing the unit along. The rear push handles are preferably foldable to permit storage during transport in a vehicle.

The cooler lid assembly is hingedly attached to one side or end of the cooler body, and is preferably secured in the closed position by a latch attached to the opposite side or end of the cooler body. The lid assembly covers the food/ice storage compartment inside the cooler body and is preferably manufactured from molded plastic.

In a preferred embodiment, the lid assembly is divided into two sections forming forward and rear storage compartments, which can optionally house sliding drawers. The drawer units can include handles on the outside surfaces and a latch may be attached to each drawer unit to secure it in place.

The top surface of the lid is preferably molded in such a way as to provide one or more seat units for small children to sit on. Each seat unit can independently comprise a seat and a seat back that is removable from the lid or fold down toward the seat on the lid. A seat unit can also include a safety bar that surrounds the position where the child would be seated to prevent the child from falling out of the seat.

Other preferred embodiments of the ice chest stroller include one or more drink or beverage holders, lock down mechanisms for removable seat backs, draw organizers, a drain plug for the insulated storage area, and a rack or shelf within the enclosed storage area, and a seat belt or strap to secure passengers to the seats. Still other preferred embodiments of the invention include lock downs for securing portable infants seats to the lid of the cooler.

Accordingly one aspect of the invention provides a rolling combination ice cheststroller comprising: an insulated open chest having a top and bottom, front and rear ends, and left and right sides; a lid pivotally attached to the chest for covering and closing the chest, the lid having upper and lower surfaces; at least one seat assembly on the upper surface of the lid, the seat assembly comprising a seating area integral with the upper surface of the lid and a seat back engaged with the lid; at least one handle assembly for pushing or pulling the ice chest-stroller; and a plurality of wheels engaged with the chest.

A steering assembly is preferably pivotally mounted to the bottom of the chest and engaged with the handle assembly. In general, the steering assembly will comprise at least two wheels. The handle assembly can be made retractable or foldable so that it will retract to a position below the ice chest-stroller or will be foldable to a position adjacent to the front or rear ends of the chest. A foot support can be included in the ice chest-stroller to support the feet of a person sitting in the seat. Preferred embodiments of the ice chest-stroller will have at least two wheel assemblies, at least one flap which is engaged with the chest to form a table, at least one restraining device per seat assembly to maintain a person seated in the seat, and/or one storage compartment within each seat assembly. The storage compartments can also comprise drawers. In the most preferred embodiments the ice chest-stroller will comprise at least four wheels each disposed adjacent a respective one of the four comers of the ice chest-stroller.

Another aspect of the invention provides a rolling combination ice chest-stroller comprising: an insulated open chest having a top and bottom, front and rear ends, and left and right sides; a lid pivotally attached to the chest for covering and closing the chest, the lid having upper and lower surfaces; at least one seat assembly on the upper surface of the lid, the seat assembly comprising a seat back pivotally engaged with the lid and a seating area integral with the upper surface of the lid; at least one retractable handle assembly for pushing or pulling said ice chest-stroller; a steering assembly pivotally engaged with the chest; and a plurality of wheels engaged with the ice chest-stroller.

Depending on the embodiment of the invention employed, at least two of the plurality of wheels will be pivotally engaged with the chest or the steering assembly will be pivotally engaged with the chest. The steering assembly can be engaged with at least one handle. The steering assembly and at least one handle can be disposed adjacent to the same end and/or adjacent to opposite ends of the chest.

BRIEF DESCRIPTION OF THE DRAWINGS

The following drawings are part of the present specification and are included to further demonstrate certain aspects of the invention. The invention may be better understood by reference to one or more of these drawings in combination with the detailed description of the specific embodiments presented herein. The present figures are not drawn to scale.

DETAILED DESCRIPTION OF THE INVENTION

Figure 1:
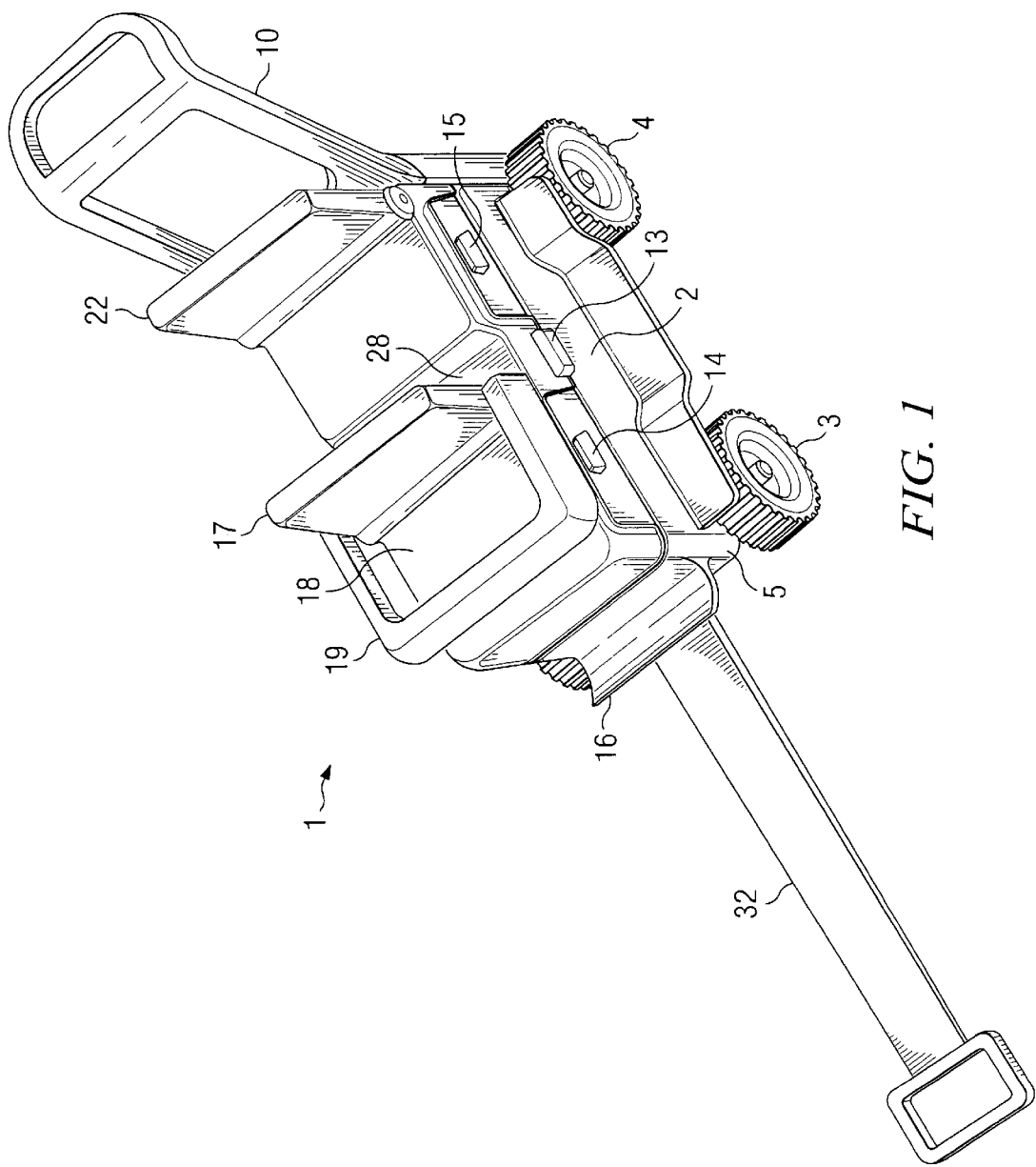
FIG. 1 is a perspective view of the ice chest-stroller according to the invention.
Figure 2:
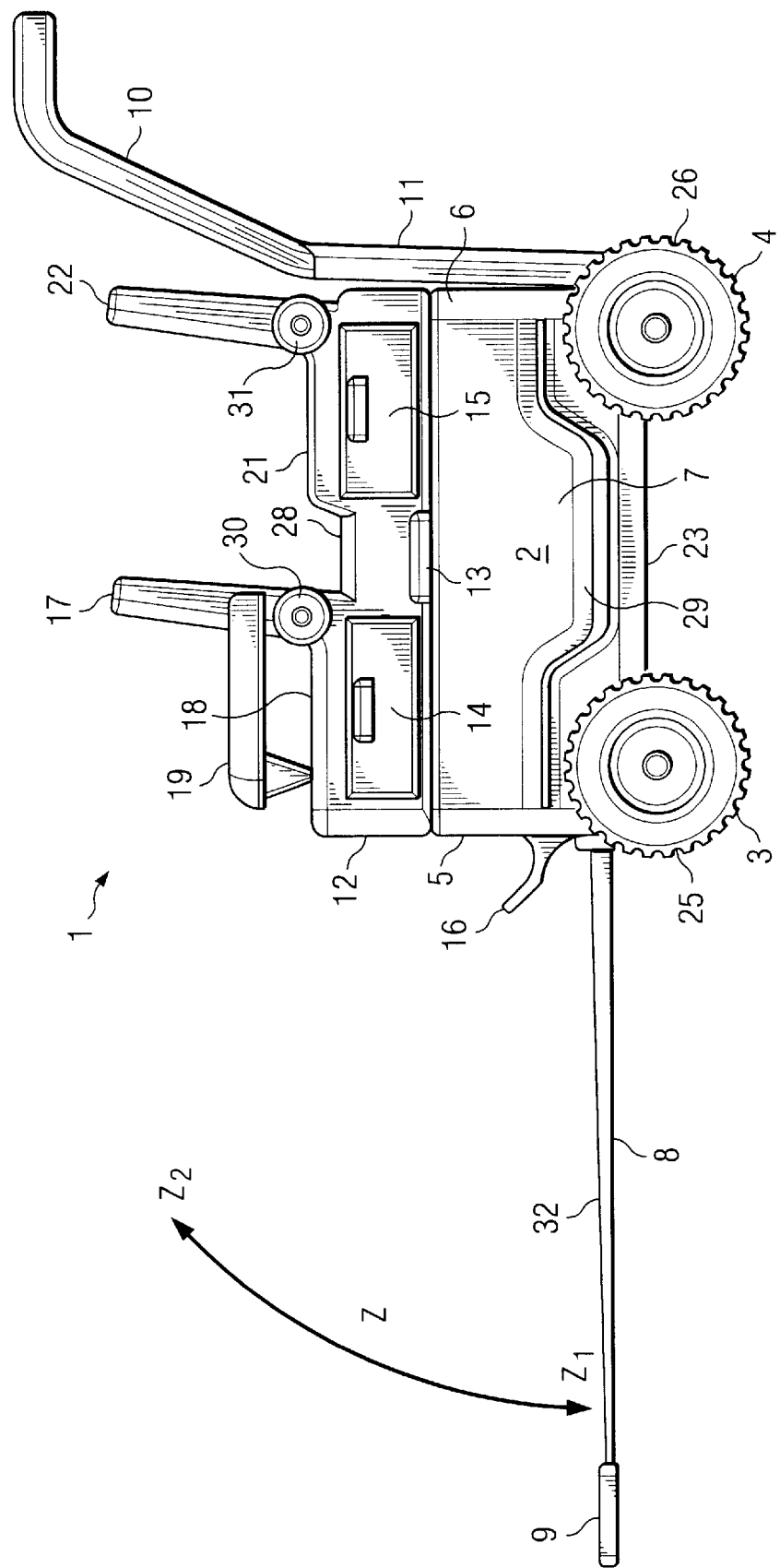
FIG. 2 is a side elevation view of the ice chest stroller according to the invention.
Figure 3:
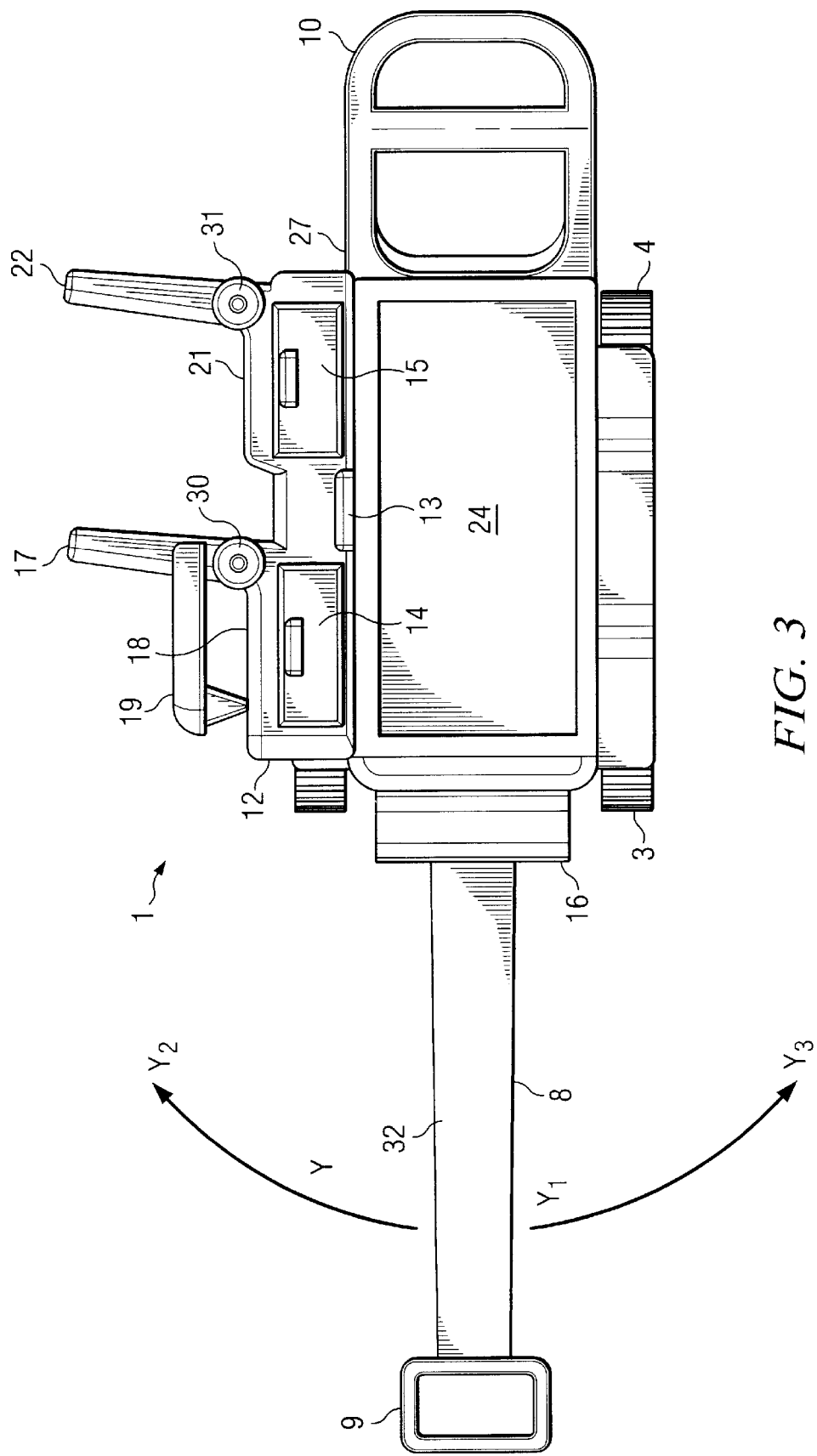
FIG. 3 is a top plan view of the ice chest-stroller showing the lid assembly in an open position exposing the cooler storage compartment.

As depicted in FIGS. 1–4, the ice chest-stroller unit 1, in accordance with a preferred embodiment of the present invention, includes an insulated open chest having a rectangular shape and comprising a front end 5, a rear end 6, and two opposing sides 7 terminating at the bottom portion 23. The ice chest-stroller is enclosed at the top by a hinged lid assembly 12. The chest has an insulated cavity 24 formed by insulated walls. Affixed to the bottom front end 25 of the cooler body 2 is a steering assembly 3. The lid assembly 12 is attached to the top surface of the cooler body 2 by means of a hinge 27 and secured with a latch 13. Included in the lid assembly 12 is a forward drawer storage unit 14 and a rear drawer storage unit 15. Directly above the forward drawer storage unit 14 and said rear drawer storage unit 15 is a forward child seat 18 and a rear child 21, respectively. Each child seat 18 and 21 is adjacent a fold down or removable seat back 17 and 22, respectively. A safety guard, or restraining device, 19 surrounds each child in the seat front 18 and rear 21 (not shown) seats. A forward foot rest 16 is attached to the cooler body front end 5. A foot recess 28 is provided between the seating areas 18 and 21 with optional foot rests 29 are located on each opposing side 7 of the cooler body 2. A hinge 30 is provided for the front child seat back 17 to facilitate folding the child seat back 17 down for storage. In a like manner, a hinge 31 is provided for the rear child seat back 22. Affixed to the bottom rear end 26 of the cooler body 2 is the rear wheel/axle assembly 4.

A forward protruding bar 8 terminating at the front of the bar in a handle 9 forms a tow bar 32 for pulling the chest stroller 1 along on its wheels. The rear of the forward protruding bar 8 is attached to the steering assembly 3 so that it will pivot in the direction of the arrow Y between positions $Y_1$, $Y_2$ and $Y_3$ to one side or the other depending on the amount of lateral force placed on the tow handle 32 thereby providing a means for steering the chest stroller. In a similar fashion, the tow bar can raise and lower between positions $Z_1$, and $Z_2$ indicated by the arrow Z. The drawer units are latched closed with the child seat backs and safety bars folded down. With the lid assembly closed, each of the two drawer units may be accessed by sliding the units out from under the child seats. Various supplies may be placed within these units. A rear push handle 10 protrudes generally upward and rearward from the rear end 6 of the cooler body 2 providing a means to push the unit along on its steering assembly 3 and wheel assembly 4. A joint 11 in the push handle 10 allows it to be folded down in the direction of arrow X between positions $X_1$ and $X_2$. The tow bar 32 disengages from the pivot on the steering assembly 3 and retracts under the bottom surface 23 of the cooler body 2 for compact storage or to allow the ice chest stroller 1 to be pushed from the rear.

In use the ice chest stroller 1 may be stocked with ice and food and/or beverages arranged or placed into the cooler body cavity 24 by lifting the assembly 12 on its hinges 27. After placing the desired items into the cooler body 2, the lid assembly 12 is closed and secured to the cooler body 2 by a latch 13. Non-cooled supplies may be stored within the two drawer units 14 and 15 in the lid assembly 12. The entire ice chest stroller 1 can then be placed with the tow bar 32, push handle 10, and forward and rear child seat backs 17 and 22 retracted, into a vehicle for transport to a chosen destination.

The tow bar 32 may be extended out from under the cooler body 12 if desired or the push handle 10 can be rotated upward from its folded down position. The two seat backs 17 and 22 can be rotated rearward to a near-vertical position with the safety guard 19 folded up in place surrounding each child seat 18 and 21. The unit is then ready to be pushed or pulled to the desired destination. Supplies may be accessed at any time by opening either front or rear drawer units 14 and 15. The children must be removed from their child seats 18 and 21 prior to lifting the lid assembly 12 to remove food and beverages from the cooler body interior cavity 24. If desired, the ice-chest can also include a drain plug disposed toward the bottom of the ice-chest.

The seat in front of the unit is positioned so that the child's feet hang over the front of the cooler body and rest on a forward ledge attached to the cooler body front vertical surface just above the tow bar. Leg room for a child in the rear seat may be provided by a recessed area between the forward and rear drawer units or alternately a foot rest formed by a ledge attached to each side of the cooler body.

This insulated compartment is accessed by unlatching the mechanism on the lid assembly and lifting and tilting the lid with the drawer storage units and child seats upward to a convenient position for loading. The drawer units are latched closed with the child seat backs and safety bars folded down. Various non-cooler supplies may be placed within the storage units in the lid.

With both the front tow bar and the rear push handle retracted and folded down, and with the child seat backs folded down, the ice chest/stroller unit can be easily grasped by the front foot rest and rear push handle, picked up and placed in the trunk of a car, rear of a truck or sport utility or any other desired location. In the same manner the ice chest/stroller may be removed from the vehicle, the child seats set up to an upright position, either the front tow bar or rear push handle removed from their respective retracted positions to their operating positions, and be pushed or pulled to the desired destination. One or two small children may safely be seated in the child seats for the journey.

A restraining device 19 depicted in FIG. 1 is a safety bar with which together with seat back 17 completely encircles a person setting in seat 18. The retaining device 19 need not be a bar but can also be a strap, rope, harness or other equivalent device for restraining a person to a seat.

The seating areas 18 and 21 are shown as being integral with the lid of the cooler-stroller; however, the seating areas can further include pads to improve seating comfort.

The seat backs 17 and 22 are depicted as having hinged joints 30 and 31, respectively, by which they can move between upright and lowered positions. The seat backs, however, can be removably attached to the lid assembly 12. The removable attachment means can be a sliding joint, a snap joint, threaded engagement, or other such means of removably attaching a door or lid to another structure.

Figure 4:
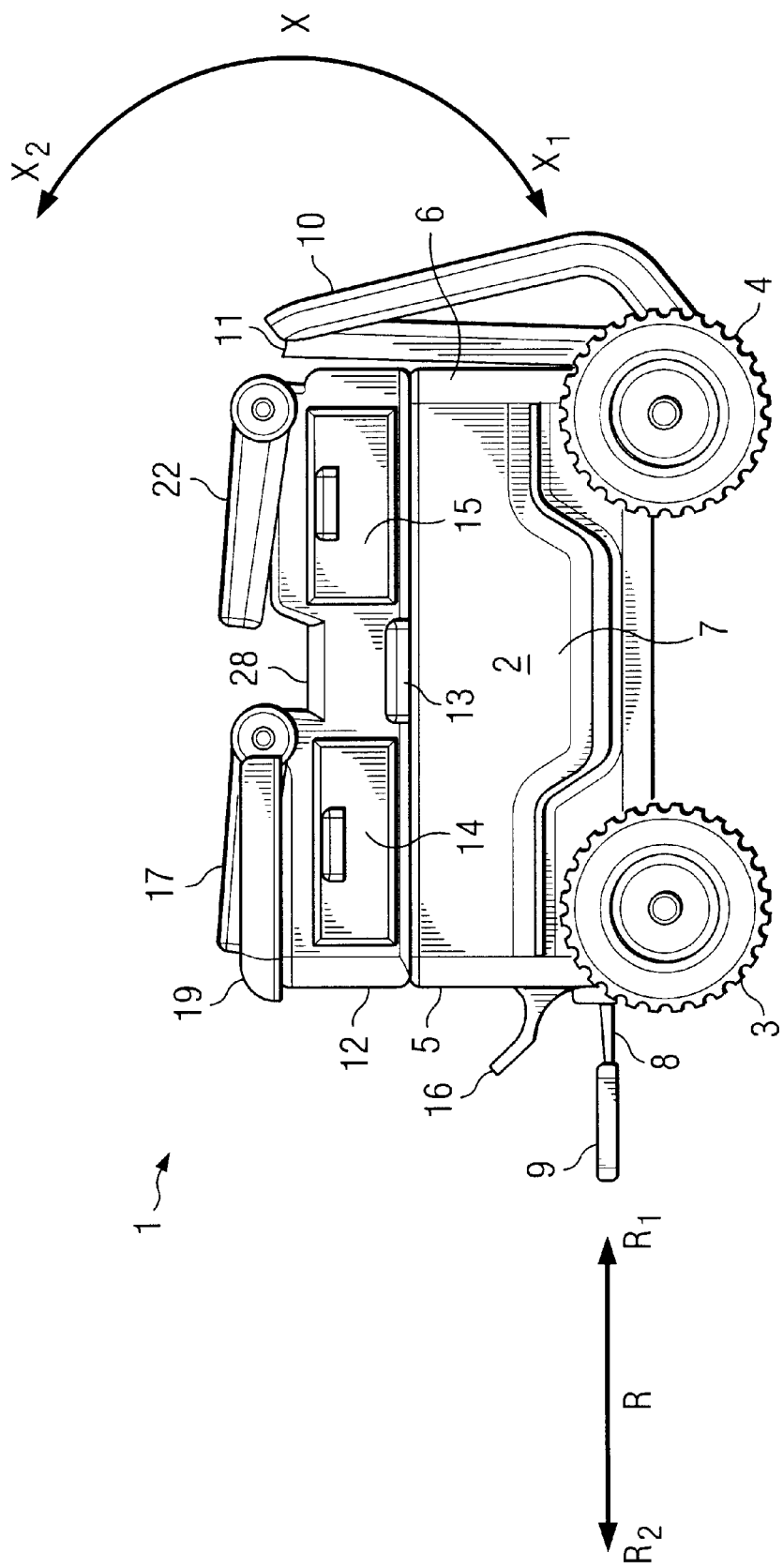
FIG. 4 is a side elevation view of the ice chest-stroller having the tow bar retracted, the push handle folded and seat backs folded down covering portions of their respective seating areas.

The forward handle assembly comprised of the protruding bar 8 and the grasp handle 9 is shown retracted in FIG. 4 and the rearward handle attachment is shown folded. The location of these handles can be reversed. The cooler-stroller can have two folding handles or two retractable handles. While one of the handles is shown retractable below the cooler, it may also be retractable along the side or along one of the ends of the cooler. Further a single handle can be adapted to engage with either one or both ends of the chest. The sections of the push handle 10 can be in telescopic rather than folding engagement.

When the ice chest-stroller has two seats, it will preferably comprise a foot recess 28 between the seats. The foot recess can be disposed solely between the seats or between the seats and under a portion of the front most seat.

Although not depicted in the attached figures, the combination ice chest-stroller can further include flap sections disposed on either one or both of the sides and/or one or either one or both of the ends of the chest. These flap sections will be pivotally and/or hingedly engaged with the chest body such that they can be raised to a first position to form a table surface or lowered to a second position to be adjacent the side or end of the chest body.

The above is a detailed description of particular embodiments of the invention. It is recognized that the departures from the enclosed embodiments may be made within the scope of the invention and that obvious modifications will occur to a person skilled in the art. Those of skill in the art should, in light of the present disclosure, appreciate that many changes can be made in the specific embodiments which are disclosed here and still obtain a like or similar result without departing from the spirit and scope of the invention. All of the embodiments disclosed and claimed herein can be made and executed without undue experimentation in light of the present disclosure.

What is claimed is:

1. A rolling combination ice chest-stroller comprising:
   an insulated chest having a top and a bottom, a front and a rear, and left and right sides;
   a lid selectively attached to and retractable from said chest for covering said chest, said lid having upper and lower surfaces;
   a plurality of seat assemblies each being integrated with the upper surface of said lid, each said seat assembly comprising:
      a seating area configured to seat a child, the seating area integral with the upper surface of said lid,
      a seat back cooperating with said seating area and engaged with said lid, and
      a pivotable tow bar coupled to the chest and accessible from the front of the chest, the tow bar being pivotable in the lateral and vertical direction; and
   four wheels engaged with said chest, a steering assembly pivotally mounted to the bottom of said chest and engaged with said tow bar, said steering assembly including at least two of said plurality of wheels,
   a foot recess between two of said seat assemblies,
   a footrest adapted to support the feet of a person sitting in at least one of said assemblies,
   at least one restraining device for temporarily keeping a person seated in at least one of said seat assemblies.

2. A rolling combination ice chest-stroller according to claim 1, further comprising at least one storage compartment below said seating area and disposed within said lid.

3. A rolling combination ice chest-stroller according to claim 1, wherein said ice chest-stroller comprises at least two handles including a retractable first handle disposed on the front end of aid chest for pulling said ice chest-stroller and a foldable second handle disposed on rear end of said chest for pushing said ice chest-stroller.

4. A rolling combination ice chest-stroller according to claim 1, wherein said ice chest-stroller comprises at least two seat assemblies on the upper surface of said lid.

5. A rolling combination ice chest-stroller according to claim 1, wherein said seat back is pivotally or removably engaged with said lid.

6. A rolling combination ice chest-stroller according to claim 1, wherein said lid is pivotally attached to the top of said chest; and said ice chest-stroller comprises:
   at least two seat assemblies on the upper surface of said lid, each seat assembly comprising a seating area integral with the upper surface of said lid and a seat back engaged with said lid.

7. A rolling combination ice chest-stroller according to claim 6, wherein said ice chest-stroller comprises:
   a first retractable handle assembly for pushing said ice chest-stroller; and
   a second foldable handle assembly for pulling said ice chest-stroller.

8. A rolling combination ice chest-stroller according to claim 6, wherein said ice chest-stroller comprises:
   a storage compartment in each seat assembly, wherein said storage compartment is below each seating area and disposed within said lid.

9. A rolling combination ice chest-stroller according to claim 8, wherein at least one of said storage compartments comprises a drawer.

10. A rolling combination ice chest-stroller according to claim 6, wherein said ice chest-stroller comprises:

at least four wheels, wherein at least two wheels are engaged with said steering assembly that is pivotally mounted to the bottom of said chest and at least two other wheels are engaged with said chest.

11. A rolling combination ice chest-stroller according to claim 1, wherein at least two of said plurality of wheels are pivotally engaged with said chest.

12. The ice chest-stroller of claim 1, wherein the seat assembly further comprises:

a retaining bar configured to secure a child in the seating area.

* * * * *